J. A. MAYNARD.
NUT LOCK.
APPLICATION FILED MAR. 17, 1913.

1,101,461.  
Patented June 23, 1914.

WITNESSES  
Carroll Bailey  
S. White

INVENTOR  
Joseph A. Maynard,  
by Richard Burden  
His Attorney

COLUMBIA PLANOGRAPH CO., WASHINGTON, D. C.

UNITED STATES PATENT OFFICE.

JOSEPH A. MAYNARD, OF RAVENA, NEW YORK, ASSIGNOR OF ONE-HALF TO OSCAR BROOKS, OF RAVENA, NEW YORK.

NUT-LOCK.

1,101,461. Specification of Letters Patent. Patented June 23, 1914.

Application filed March 17, 1913. Serial No. 754,945.

*To all whom it may concern:*

Be it known that I, JOSEPH A. MAYNARD, citizen of the United States, residing at Ravena, in the county of Albany and State of New York, have invented certain new and useful Improvements in Nut-Locks, of which the following is a specification.

This invention relates to nut locks of the pawl and ratchet washer-carried pawl type, and as its principal object it aims to provide a device whereby the nut is locked on the bolt shank and held against negative rotation thereon.

A further object is to provide a nut lock wherein the locking mechanism is constructed with such regard to proportion, number and arrangement of parts that it may be cheaply manufactured.

The above and additional objects are accomplished by such means as are illustrated in the accompanying drawings, described in the following specification and then more particularly pointed out in the claims which are appended hereto and form a part of this application.

Figure 1:
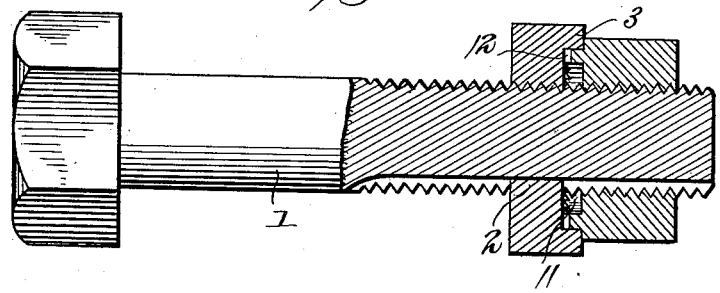
Figure 2:
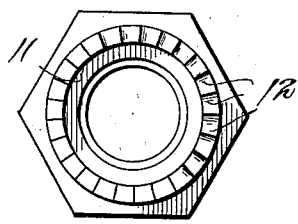
Figure 3:
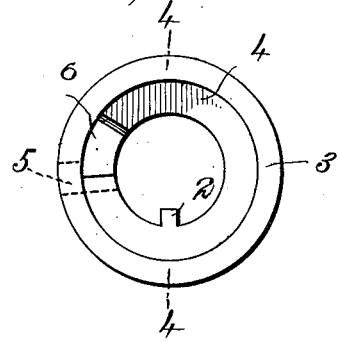
Figure 4:
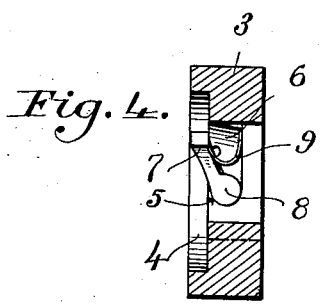
Figure 5:
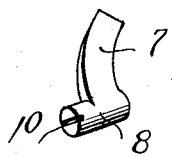

With reference to the drawings, wherein, I have illustrated the preferred embodiment of my invention as it is reduced to practice, and throughout the several views of which, similar reference numerals designate corresponding parts: Figure 1, is a longitudinal sectional view illustrating the nut in locked position. Fig. 2, is a front elevation of the ratchet face of the nut. Fig. 3, is a front elevation of the contacting face of the washer with the locking pawl removed. Fig. 4, is section on the line 4—4 of Fig. 3 showing the pawl in locking position. Fig. 5, is a detailed view of the locking pawl.

Proceeding now to a description of the drawings, numeral 1 designates a bolt shank of the customary type, which is formed with a longitudinally extending groove adapted to receive a lug 2 formed integrally with a washer 3, for the obvious purpose of holding the washer against rotation on the bolt shank. The washer is formed with an annular recess 4 for the purpose to be hereinafter disclosed and is further provided with a radially extending bore 5 which communicates with an arcuate recess 6 formed in the bottom wall of the recess 4. The locking pawl 7 is formed integrally with a pivot hub 8 which is disposed in assembled position within the radial bore 5 in such position as to permit the swinging movement of the pawl 7 within the recess 6. Secured to the inner face of the pawl 7 is a leaf spring 9 the free end of which bears against the adjacent wall of the recess 6 and acts to rotate the member 7 on its hub 8 outwardly from the washer as illustrated in Fig. 4. The hub 8 is provided with a screw head as at 10 to permit the exterior manipulation of the pawl when the nut is to be removed.

The nut of this invention may be of any conventional design, and carries on its locking face an annular flange 11, which is formed with the ratchet teeth 12 thus producing a ratchet ring which when engaged by the locking pawl 7 acts to prevent the negative rotation of the nut. The flange 11 is slightly less in diameter than the annular recess 4 and in the assembled position of the nut and washer is adapted to operate therein.

As to the operation of the device it will be readily noted that after the washer has been placed on the bolt shank with the lug 2 seated in the longitudinal groove referred to above, the nut may be applied to the bolt shank in the usual manner and upon engagement with the washer the ratchet teeth will pass over the pawl 7 against the tension of the spring 9 during the positive rotation of the nut. However any external force or effort to remove the nut by giving it the necessary negative rotations will be of no avail. The pawl 7 is withdrawn into the recess 6 by the application of a screw driver or the like to the head 10 of the hub 8.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. A nut lock including a washer and a nut, means carried by said washer for holding it in non-rotatable position on the bolt shank, a spring-pressed pawl mounted for operation in a recess formed in said washer, said pawl being formed integrally with a hub pivotally mounted in a radially extending bore formed in said washer, said hub being disposed for external manipulation, a ratchet ring formed integrally with said nut and disposed within an annular recess formed in said washer, said ratchet ring being further adapted for engagement by said pawl.

2. A nut lock comprising a bolt, a washer mounted upon said bolt and prevented from having rotation thereon, said washer being provided with an annular recess at the outer end of its central opening and with a radially-extending bore terminating at its inner end in a pocket communicating with said recess, a pawl provided with a hub rotatably mounted in said bore, a nut mounted upon said bolt and provided with ratchet teeth extending into said recess, and resilient means in said pocket for engaging said pawl to yieldably hold the same in engagement with said ratchet teeth, the outer-end portion of said hub being provided with means for permitting said hub to be rotated to move said pawl into said pocket against the tension of said spring out of engagement with said ratchet teeth.

In testimony whereof I affix my signature in presence of two witnesses.

JOSEPH A. MAYNARD.

Witnesses:
SAMUEL ROSENTHAL,
LOUIS PALTENEJHI.

---

Copies of this patent may be obtained for five cents each, by addressing the "Commissioner of Patents, Washington, D. C."